G. B. Halsted.
Nº 48,061  Tea-Pot.  Patented June 6 1865.
Reissued Apr. 30, 1867.
Fig. 1.    Fig. 2.
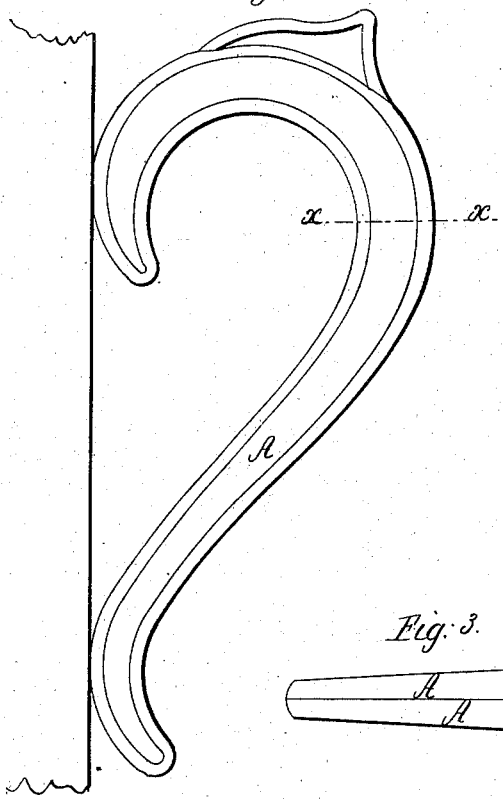
Fig. 3.
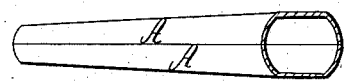
Fig. 4.
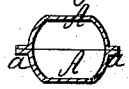
Witnesses;  Inventor;

UNITED STATES PATENT OFFICE.

G. B. HALSTED, OF NEW YORK, N. Y.

IMPROVEMENT IN HANDLES FOR TEA AND COFFEE POTS.

Specification forming part of Letters Patent No. 48,061, dated June 6, 1865.

*To all whom it may concern:*

Be it known that I, G. B. HALSTED, of the city, county, and State of New York, have invented a new Improvement in Handles for Sheet-Metal Tea and Coffee Pots and other Similar Sheet-Metal Vessels; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, an edge view of the same; Fig. 3, a transverse section of the same, taken in the line $x\ x$, Fig. 1; Fig. 4, a transverse section of the same in an unfinished state.

Similar letters of reference indicate like parts.

The object of this invention is to obtain a sheet-metal handle for sheet-metal tea and coffee pots and other similar sheet-metal vessels, which may be cheaply constructed and have a neat and ornamental appearance, far more so than the common sheet-metal and cast-iron handles hitherto used. The superior class of sheet-metal tea and coffee pots are now provided with japanned cast-iron handles, and also with white-metal handles. These, however, receive and retain the heat from the warm contents of the vessel, and are heavy and expensive, so much so as to augment very materially the cost of such articles.

My invention consists in having the handles constructed of two longitudinal parts swaged or struck up in proper form out of sheet metal, and connected together by solder, or otherwise, so as to form a thin hollow or tubular handle, substantially as hereinafter set forth.

A A represent the two parts of the handle, which are swaged or struck up by means of proper dies of the form or shape desired. Tin-plate will probably be the material most generally used, although other sheet-metal plate may in certain cases be employed. The two parts A A are swaged by reverse dies, so that when joined or abutted together a hollow or tubular handle will be formed, as shown clearly in Fig. 3. After the parts are swaged or struck up the burr $a$, Fig. 4, is trimmed off and the parts connected together by solder, or otherwise. The handle, when finished, is also connected to the vessel by solder. The parts A may be swaged or struck up so as to have a smooth exterior, or have any ornamental configuration or design upon it.

Besides the economy attending this mode of construction, the handle possesses the advantage of being retained in a cool state, as it is tubular, and contains but little metal, and hence will not receive and retain in a material degree the heat from the warm contents of the vessel to which it is attached.

Having thus described my invention, I claim as new and desire to secure by Letters Patent—

As a new article of manufacture, a handle for sheet-metal tea and coffee pots and other similar sheet-metal vessels, constructed of two longitudinal parts swaged or struck up, in any proper or desired form, out of sheet metal, and connected together by solder or otherwise, substantially as herein set forth.

G. B. HALSTED.

Witnesses:
WM. S. MCNAMARA,
JAS. P. HALL.